Jan. 23, 1973 W. R. SCHLEHR 3,712,801
FLOAT GLASS CHAMBER HAVING THIN-LAMINATED CARBON BOTTOM

Original Filed Oct. 6, 1967     2 Sheets-Sheet 1

WALTER R. SCHLEHR
INVENTOR
BY John H. Faulkner
William P. Johnson
ATTORNEYS

WALTER R. SCHLEHR
INVENTOR

United States Patent Office 3,712,801
Patented Jan. 23, 1973

3,712,801
FLOAT GLASS CHAMBER HAVING THIN-LAMINATED CARBON BOTTOM
Walter R. Schlehr, Dearborn, Mich., assignor to Ford Motor Comany, Dearborn, Mich.
Continuation of abandoned application Ser. No. 673,435, Oct. 6, 1967. This application Aug. 7, 1970, Ser. No. 62,213
Int. Cl. C03b 18/00
U.S. Cl. 65—182 R  10 Claims

ABSTRACT OF THE DISCLOSURE

A substantially enclosed chamber utilized in the float process of manufacturing flat glass contains refractory to define a cavity in which a molten metal bath is supported. Molten glass is flowed out upon the bath and solidified as it passes along the length of the chamber to produce a ribbon of glass. The refractory defining the bottom of the cavity is lined in certain zones thereof with slabs of carbonaceous material and in other zones thereof a thin layer of carbonaceous material is laminated to the refractory. The utilization of the laminated refractory provides protection for the refractory from engagement thereof by the glass ribbon and also provides a means for interrupting conductive heat transfer along the length of the chamber through solid liner blocks of carbonaceous material.

---

This application is a continuation of application Ser. No. 673,435, filed Oct. 6, 1967, now abandoned.

BACKGROUND OF THE INVENTION

This invention relates to the construction of a chamber for utilization in the manufacture of flat glass by the so-called "float process." In the "float process," molten glass is poured on the surface of a molten bath contained in a chamber to obtain a glass ribbon having true parallelism of its opposite faces and a lustrous, fire-polished finish.

Generally, in the "float process," the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with solid slabs of a carbonaceous material. Such slabs, usually made from graphite, are positioned in the chamber in a manner and for a purpose more fully disclosed in U.S. Pat. 3,393,061, assigned to the same assignee as this application. The utilization of a liner formed from solid slabs of carbonaceous material has its advantages. However, a carbonaceous material such as graphite is an excellent thermal conductor. As such, heat is conducted away from various hotter zones of the chamber to cooler zones of the chamber when such a liner is utilized.

The loss of heat from hotter zones of the chamber to cooler zones is, of course, not desirable. Such heat losses must be compensated for by supplying additional heat to the hotter zones of the chamber. On the other hand, the interruption of the conductive heat transfer through the carbonaceous liner by removal of carbonaceous slabs from certain zones of the chamber has its attendant difficulties in that these zones of the chamber will not have a protective lining therein. In these unprotected zones of the chamber, wherein only refractory material is utilized to define the bottom of the metal receiving cavity, the refractory is more prone to being damaged by contact therewith of the glass ribbon.

SUMMARY OF THE INVENTION

This invention is directed to the construction of a chamber for utilization in the "float process" of manufacturing glass, and more particularly, this invention is directed to the construction of such a chamber wherein the conductive heat transfer through a liner formed by solid carbonaceous material is reduced and wherein the protective qualities of a carbonaceous material are retained in all areas of the chamber.

The chamber for manufacturing glass is constructed in accordance with the principles and teachings of this invention in the following manner. Refractory ceramic material is utilized to define a cavity which receives and supports molten metal therein. At least a portion of the refractory material defining the bottom surface of the cavity has a thin layer of carbonaceous material laminated to the surface thereof in direct engagement with the tin.

In accordance with the more detailed teachings of this invention, other areas of the refractory material utilized to define the bottom of the cavity may have a liner thereover of solid carbonaceous material. The cooler zones of the chamber have the refractory material with the carbonaceous laminae instead of having the solid carbonaceous material liner thereover. With such a construction, heat is not conducted through the solid carbonaceous material from a hot zone to an adjacent cooler zone of the chamber because the solid carbonaceous liner is interrupted at the approximate boundary line between the hot and cool zones. The laminated, carbonaceous layer on the refractory provides the protective qualities of the carbonaceous material to the refractory and, as such, the refractory is protected from contact thereof by the glass ribbon.

In another embodiment of a float chamber construction in accordance with detailed teachings of this invention, the laminated refractory material is utilized in first and second cooling zones of the chamber as well as in a initial portion of a flow-out zone of the chamber. In the remaining zones of the chamber, solid carbonaceous material is utilized as a refractory lining material. The refractory materials in the various zones of the chamber are adjusted to such relative heights that the top of the laminated refractory and the solid carbonaceous liner slabs are in such relative positions that they define a smooth and uniform surface throughout the chamber.

DESCRIPTION OF THE PREFERRED EMBODIMENT

General construction of float chamber

Figure 1:
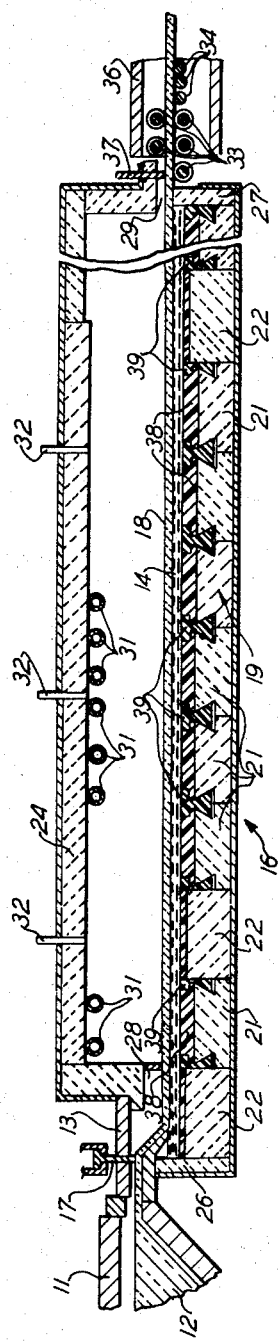
FIG. 1 is an elevational view, in cross section, showing the improved chamber of this invention for utilization in the manufacture of flat glass.

Referring now to the drawings, in FIG. 1 there is seen the delivery end of a conventional glass melting furnace 11 in which a constant level of glass 12 is maintained. The molten glass is delivered through a forehearth 13 onto the surface of a bath 14 of molten tin contained within a chamber, generally identified by the numeral 16. A tweel 17 controls the rate of glass flow from the furnace 11. The molten bath 14 has a density greater than that of glass 12 so the glass will flow on the surface thereof. By delivering molten glass at a constant rate and by withdrawing a continuous sheet of glass thus formed at a constant rate, a continuous ribbon of glass 18 of uniform width is produced. Preferably, the bath 14 is molten tin but an alloy of tin may also be utilized.

The chamber 16 has a lower refractory section, generally identified by the numeral 19, which is composed of notched refractory block 21 and laminated refractory block 22. The chamber also has refractory side blocks 23, an upper refractory section 24 and refractory end walls 26 and 27. All of the refractory walls or sections both are formed from a plurality of refractory blocks and are joined together except for a restricted entrance 28 and exit 29 to provide the substantially enclosed chamber 16. The refractory side blocks 23 and the refractory end walls 26 and 27 project above the top surface of the lower refractory section 19 to define the cavity or container for receiving the molten tin 14.

To maintain the tin in a molten condition and the glass ribbon 18 at the proper temperatures required to form a ribbon of good optical quality, electrical heaters 31 (FIG. 1) are installed in the upper refractory section 24 of the chamber 16. Coolers may also be installed in cooling zones of the chamber 16 to assure that the glass ribbon will be sufficiently cooled and hardened to be removed through the exit 29 without damage to the ribbon. The electrical heaters 31 are connected to a conventional power source (not shown) and may be individually controlled to provide the desired thermal gradient between the various functionally classified zones of the chamber thereby to obtain the desired rate of cooling of the ribbon 18 as it progresses through the chamber. Preferably, the molten glass 12 is introduced into the chamber at a temperature of about 1850° F. and then, as the glass solidifies to form the ribbon, the glass is progressively cooled to a temperature of about 1100° F. at the exit 29.

An atmosphere gas is introduced into the chamber 16 through gas inlets 32 in order to provide a protective atmosphere within the chamber above the molten tin and the glass floating thereupon. The atmosphere gas should be inert toward both carbonaceous material and the tin making up the bath and actively reducing toward tin oxide. Also, the atmosphere gas should contain not more than traces of oxygen, carbon dioxide or water vapor. As more fully described in U.S. Pat. 3,332,763, issued July 25, 1967, and assigned to the same assignee as this application, a protective atmosphere consisting essentially of, by volume, 4% carbon monoxide, 4% hydrogen and the remainder nitrogen, is the preferred inert atmosphere when carbonaceous material is utilized in the chamber.

The cooled glass ribbon 18 is withdrawn by driven traction rolls 33 onto a conveyor 34 to enter an annealing lehr 36 where the ribbon 18 is further cooled under controlled conditions to remove or reduce residual stresses therein. The exit 29 of the chamber 16 may be provided with a sealing member 37 to retain the protective atmosphere gas in and prevent the entrance of outside atmosphere into the chamber.

Figure 2:
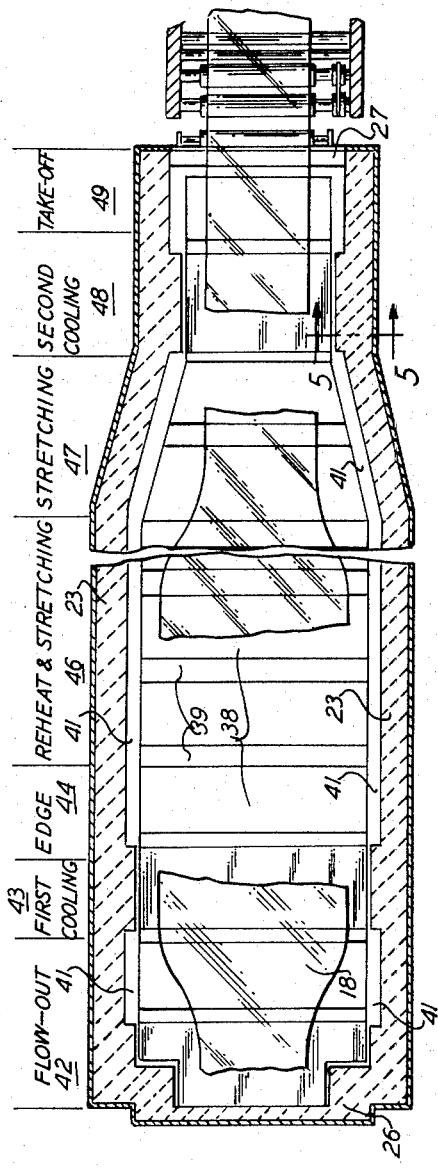
FIG. 2 is a plan view, in cross section, of the improved chamber of FIG. 1.

As described more fully in previously mentioned Pat. No. 3,393,061, a series of rectangular slabs 38, preferably of solid carbonaceous material, such as graphite, are provided in the chamber 16. As best seen in FIG. 2, where labels identify various functional zones of the chamber 16 are utilized, the slabs 38 are installed, in accordance with the teachings of this invention, in a portion of the flow-out zone of the chamber, and in the remaining zones of the chamber with the exclusion of the first and second cooling zones.

While in FIG. 2 the individual slabs 38 are shown as running the full width of the chamber 16, it should be appreciated that one width of the chamber is lined with a plurality of the slabs 38. There slabs are preferably coextensive with a plurality of the refractory blocks 21 utilized to line one width of the chamber such that if any upheaval occurs in the lower refractory section 19, the individual liner slabs will adjust to the situation and there will be no buckling or cracking of a unitary piece of graphite material.

With reference to FIGS. 1 and 2, each transversely extending set or series of slabs 38 is held in position by transversely extending series of keys 39. The keys are generally shorter in length than the slabs and, therefore, a greater number of keys extend across the width of the chamber 16. The keys 39 have the bottom portion thereof received in the notched out refractory blocks 21. It may also be noted from FIG. 1 that the notched refractory blocks 21 are shorter in height than the laminated refractory block 22 such that the top surfaces of the laminated block and the rectangular slabs 38 together define a smooth, continuous surface for the bath 14 to be received upon.

The slabs 38 and the keys 39, since they are preferably made from graphite, which is substantially less dense than the molten tin, are raised above the lower refractory section 19 by a buoyant force exerted thereon by the tin. Graphite slabs and keys do not rise to the top surface of the tin and float thereupon because of the manner in which the keys anchor the rectangular slabs to the notched out refractory block 21. A depth of molten tin above the slabs is maintained at a level of from ½ to 4 inches in order to reduce the likelihood of the glass ribbon 18 coming into contact with the slabs if and when the glass ribbon buckles within the chamber.

As best seen in FIG. 2, the refractory side blocks 23 have a side wall liner 41 extending along the various zones of the chamber wherein the solid carbonaceous material or slabs 38 are utilized to line the bottom of the chamber. The side wall liner 41 is utilized to protect the side refractory blocks in the event the glass ribbon 18 ruptures and a portion thereof moves toward the sidewall of the chamber. The sidewall liner 41 may be constructed in accordance with the principles and teachings of U.S. Pat. No. 3,481,729 and assigned to the same assignee as this application.

With reference to FIG. 2 of the drawings, there is shown therein the division of the chamber 16 into the various functionally classified zones utilized in the manufacture of flat glass by the float process.

More particularly, the chamber 16 has as an initial zone a flow-out zone 42. In this particular zone, the molten glass 12 is poured out upon the molten tin bath 14. Also, is this zone of the chamber, sufficient heat is added by means of electrical heaters 31 to insure that the molten glass poured on the tin will spread out and form the ribbon of glass 18. The ribbon will have a width determined by the equilibrium thickness to which the glass material spreads out upon the bath.

After flowing out to the equilibrium thickness, the glass ribbon 18 passes into a first cooling zone 43. The first cooling zone is maintained at a temperature substantially below the temperature at which the flow-out zone is maintained. In order to maintain the two zones at substantially different temperatures, a radiation gate (not shown) extending across the width of the chamber 16 may be secured to the upper refractory section 24 and extended downwardly therefrom to within one or two inches of the glass ribbon 18 passing through the chamber. In the first cooling zone, the molten glass material is solidified sufficiently so that it achieves a semi-rigid state. In this particular state, the glass would have a temperature of approximately 1450° F.

The glass ribbon passes from the first cooling zone 43 to an edge-holding zone 44. If the chamber 16 is being utilized to manufacture glass having a thickness less than equilibrium, edge rolls (not shown) are brought into gripping relationship with the glass ribbon 18 in the edge-holding zone such that the ribbon has a gripping force applied thereto. This gripping force tends to retard the advancement of the ribbon in a direction downstream of the chamber against the tractive force applied to the ribbon by the driven traction rollers 33. Control of the amount of tractive effort applied to the ribbon by the traction rolls is one method of controlling the stretching of the ribbon between the edge rolls and the traction rolls.

After the glass ribbon proceeds through the edge-holding zone 44, it passes into a reheat and stretching zone 46 wherein the glass ribbon is heated. Sufficient heat is added to the glass ribbon in this zone so the glass becomes plastic and may be drawn down to a reduced thickness. In the reheat and stretching zone, additional electrical heating elements 31 are provided for supplying the heat. The amount of heat added in the zone also affects the thickness to which the ribbon may be drawn down.

After passing through the reheat and stretching zone 46, the glass ribbon 18 passes into a stretching zone 47 whereat sufficient heat has been added to the ribbon to make the glass plastic. Between the gripping force applied to the ribbon by the edge rolls (not shown) in the edge-holding zone, and the tractive force applied to the ribbon by the traction rolls 33 in the annealing lehr 36, the glass is stretched out and has its thickness reduced to form the finished glass of desired thickness.

The glass ribbon 18 moves out of the stretching zone 47 and then into a second cooling zone 48. The second cooling zone may be separated from the stretching zone by a radiation gate (not shown) extending downwardly from the upper refractory section 24 to within a few inches of the glass ribbon moving thereunder. Heat is removed from the glass ribbon in the second cooling zone such that the ribbon of glass becomes self-supporting and may pass into the take-off zone 49. The ribbon is thereafter removed from the take-off zone of the chamber 16 by the driven traction rolls 33 without any marks being put into the surface of the ribbon thereby.

The above outlined zones of the float chamber 16 are illustrative of the zones into which different regions of the chamber may be functionally classified. It is understood that the particular zones may or may not be utilized in dependence upon whether equilibrium thickness or non-equilibrium thickness glass is being manufactured in the chamber.

Laminated refractory block construction and use

In a glass manufacturing chamber which has the entire length thereof lined with slabs of carbonaceous material, there is a tendency for the carbonaceous material, such as graphite, to conduct heat from the hotter zones of the chamber to the cooler zones thereof. The conduction of heat through the graphite slabs and keys is not desirable for it both increases the cooling load necessary in the cooling zones of the chamber and increases the heating loads necessary in the bottom zones of the chamber.

Figure 3:
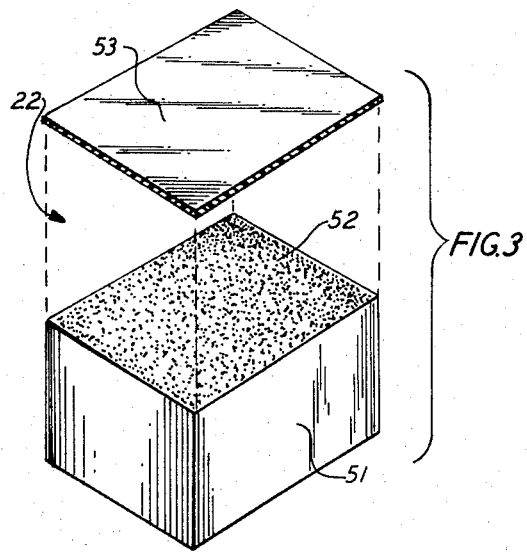
FIG. 3 is an isometric view of a refractory block prior to lamination of a carbonaceous material thereon.
Figure 4:
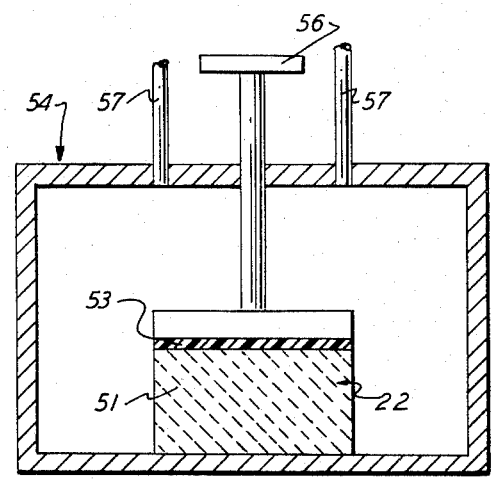
FIG. 4 is a pictorial representation of a furnace wherein the relatively thin, carbonaceous material may be laminated to the surface of a refractory block.

In accordance with the principles and teachings of this invention, select zones of the chamber 16 have a special type of laminated refractory blocks 22 utilized therein. With reference to FIGS. 3 and 4, a laminated refractory block 22 may be prepared in the following manner. A refractory block 51 has an adhesive 52 applied to the top surface to form a layer of adhesive material on the block. The adhesive 52 may be an organic composition such as a casein glue. The adhesive should be applied in generous amounts to the surface of the refractory block 51 in order to form a relatively heavy, continuous, layer on the upper surface of the refractory block.

A thin, relatively resilient, carbonaceous material, such as graphite foil 53, is brought into contact with the adhesive 52 and thereby laminated onto the refractory block 51. Graphite foil is commercially available from the National Carbon Corporation, a division of Union Carbide Corp. Graphite foil generally ranges in thickness from 5 to 15 mils. Other carbonaceuos materials may be utilized in the place of graphite foil but such materials should preferably be resilient so that they may expand and contract with the refractory in accordance with the temperature surrounding the laminated block.

The refractory block 51, after the relatively thin, carbonaceous layer 53 is laminated thereto, is placed in a curing oven 54 as depicted in FIG. 4. A pressure of the order of one pound per square inch is maintained on the thin, carbonaceous material 53 through operation of a ram 56. The pressure is applied to the refractory, adhesive and carbonaceous material while they are fired in the oven 54 to a temperature of approximately 1900° F. The laminated block is fired to a temperature in excess of the temperature it will be subjected to during utilization in the chamber. The block is then cooled in such a manner that the refractory is not damaged.

When the block is heated up sufficiently, the organic adhesive 52 dries and carbonizes and an interlocking bond is formed between the block 51 and the thin, carbonaceous material 53 thereby to form the laminated refractory block 22.

An inert, non-oxidizing atmosphere is introduced into the oven 54 through inlets 57 during the laminating operation so that the carbonaceous material 53 will not be oxidized by water vapor or carbon dioxide that may be present in the oven 54. The atmosphere utilized in the oven 54 may be slightly reducing if the refractory block 51 is not fully dried.

In accordance with the principles and teachings of this invention, the laminated refractory block 22 is installed in selected zones of the chamber 16 so as to reduce heat transfer along the length of the chamber by conduction through the solid carbonaceous liner slabs 38. More particularly, the laminated refractory material is installed at least in the second cooling zone 48. The laminated refractory block 22 is installed in this particular zone because it is in this zone that the greatest temperature reduction must take place in the glass ribbon. The glass ribbon must be cooled in the second cooling zone to a temperature whereat the ribbon will be sufficiently rigid that the surfaces of the ribbon will not be damaged or marred when gripped by the driven traction rolls 33.

The laminated refractory block 22 may also be installed in the first cooling zone so as to interrupt the solid carbonaceous liner slabs 38. The laminated refractory blocks are installed in this zone so that conductive heat transfer throught the liner slabs 38 and the keys 39 from the flow-out zone 42 is decreased. The flow-out zone is maintained at a relatively hot temperature as compared to the first cooling zone and there can be a significant loss of heat from the flow-out zone to the cooling zone by conduction through the solid carbonaceous liner.

The initial portion of the flow-out zone 42 may also have the laminated refractory block 22 installed therein. More particularly, it is most desirable to maintain the initial portion of the flow-out zone at the hottest possible temperature to promote the flowing out of the molten glass. The use of the laminated refractory block 22 in this area aids in the retention of heat by reducing any longitudinal heat transfer therefrom which would be associated with interconnected liner slabs and keys.

Figure 5:
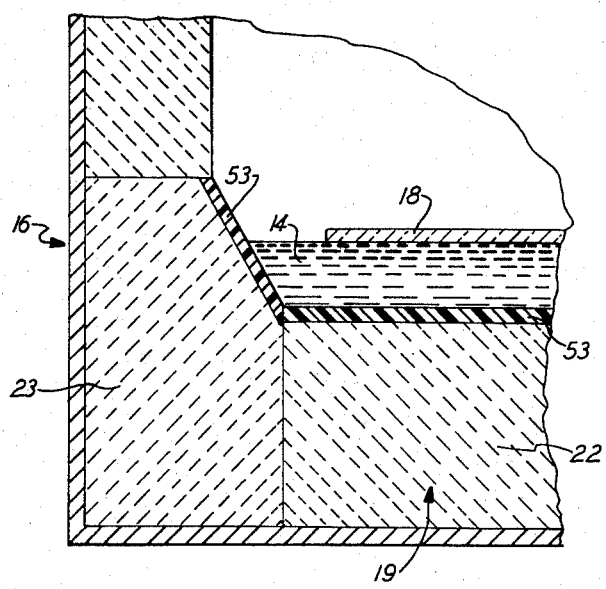
FIG. 5 is a partial, longitudinal, sectional view of the improved chamber taken along line 5—5 of FIG. 2 showing, in detail, features of the chamber.

With reference to FIG. 5, it is also beneficial to utilize a sidewall liner of longitudinally interrupted construction in the chamber 16 so that heat transfer along the length of the chamber through this sidewall liner is reduced. In this particular case, the sidewall refractory block 23 in the selected zones of the chamber 16 have the thin, relatively resilient, carbonaceous material, such as graphite foil 53, laminated thereto in accordance with that procedure described in conjunction with the formation of the laminated refractory block 22.

Thus, there has been disclosed herein a chamber for the manufacture of flat glass which utilizes a lining of carbonaceous material therein. The chamber has a solid, carbonaceous liner therein which is interrupted by zones of the chamber wherein bottom refractory blocks have a thin, carbonaceous material laminated to the surfaces thereof. The laminated refractory block interrupt the longitudinal heat transfer through the solid, carbonaceous liner material which would otherwise cause dissipation of heat from the hotter zones of the chamber. Construction of a chamber in accordance with this invention is also economical in that it reduces the cost associated with lining the chamber with solid blocks of carbonaceous material. Also, the chamber is advantageous from the standpoint that all of the refractory material in the chamber defining the bottom portion of the cavity which holds the molten tin, is covered with a carbonaceous material and, therefore, non-wettable by glass. As such, if the glass ribbon passing through the chamber ruptures or comes into contact with the material, the glass will not adhere to the refractory and cause damage thereto.

While many modifications of the basic teachings of this invention will be obvious to one skilled in the art in view of the teachings of this specification, it is intended that all such modifications which fall within the true spirit and scope of this invention be included within the scope of the appended claims.

What is claimed is:

1. A chamber for the manufacture of flat glass wherein refractory ceramic material defining at least a portion of the bottom of the cavity of the chamber which contains molten tin therein has a thin layer of carbonaceous material laminated to the surface thereof in direct engagement with the molten tin, the lamination of the carbonaceous material to the refractory ceramic material being accomplished by use of an adhesive bonding process employing heat and pressure.

2. The chamber for the manufacture of flat glass as defined in claim 1 wherein said carbonaceous material is graphite foil having a thickness in the range of 5 to 15 mils.

3. A chamber for the manufacture of flat glass wherein at least a portion of the surface of refractory ceramic material defining the bottom of the cavity which contains molten tin has a liner thereover formed with slabs of solid carbonaceous material and wherein at least another portion of the surface of the refractory material defining the bottom of the cavity has a thin layer of carbonaceous material laminated thereto, the thin material being substantially thinner than the slabs of carbonaceous material, the lamination of the thin carbonaceous material to the refractory ceramic material being accomplished by use of an adhesive bonding process employing heat and pressure.

4. The chamber for the manufacture of flat glass as defined in claim 3 wherein said slabs of carbonaceous material are constructed from graphite and wherein said carbonaceous material is graphite foil having a thickness of 5 to 15 mils.

5. The chamber for the manufacture of flat glass as defined in claim 3 wherein the portions of said refractory material are located adjacent one another and wherein the portion of said refractory material having said liner formed of slabs of carbonaceous material is of such relative height with respect to said other portion of said refractory material having said carbonaceous material laminated thereto that the tops of said carbonaceous slabs and said laminated carbonaceous material define a smooth, continuous lining for the bottom of said cavity.

6. The chamber for the manufacture of flat glass as defined in claim 5 wherein the chamber has at least a flow-out zone, a first cooling zone, a reheat and stretching zone, a second cooling zone and a take-off zone and wherein said laminated portion of said refractory ceramic material is installed in at least said second cooling zone.

7. The chamber for the manufacture of flat glass as defined in claim 6 wherein said laminated portion of said refractory ceramic material is also installed in said first cooling zone of the chamber.

8. The chamber for the manufacture of flat glass as defined in claim 7 wherein said laminated portion of said refractory material is also installed in the initial portion of said flow-out zone of the chamber.

9. A chamber for the manufacture of flat glass which comprises: a first plurality of refractory ceramic blocks defining the bottom of a cavity for receiving and supporting a tin bath therein; a second plurality of refractory ceramic blocks defining the side walls of the cavity; and relatively thin, resilient, carbonaceous material laminated to at least a portion of the first and the second plurality of refractory blocks so as to be in contacting relationship with the tin bath, the lamination of the thin carbonaceous material to the refractory ceramic material being accomplished by use of an adhesive bonding process employing heat and pressure.

10. The chamber for the manufacture of flat glass as defined in claim 9 wherein said carbonaceous material is graphite foil having a thickness of 5 to 15 mils.

References Cited

UNITED STATES PATENTS

| 3,404,972 | 10/1968 | Banner et al. | 65—65 A |
| 3,481,728 | 12/1969 | Basler et al. | 65—182 |
| 3,503,728 | 3/1970 | Iakura | 65—182 |
| 3,540,872 | 11/1970 | Oster | 65—182 R X |

ROBERT L. LINDSAY, JR., Primary Examiner

U.S. Cl. X.R.

65—374